United States Patent [19]
Provino et al.

[11] Patent Number: 5,732,282
[45] Date of Patent: Mar. 24, 1998

[54] VIRTUAL DEVICE DRIVER REGISTRY HAVING A GLOBALLY UNIQUE IDENTIFIER SUPPLYING VIRTUAL DRIVER CALL INFORMATION TO THE REQUESTING PROGRAM

[75] Inventors: Joseph E. Provino, Cambridge; Mark M. Towfigh, W. Medford; Jonathan M. Dreyer, Lexington, all of Mass.

[73] Assignee: Sun Microsystems, Inc., Mountain View, Calif.

[21] Appl. No.: 496,983

[22] Filed: Jun. 30, 1995

[51] Int. Cl.$^6$ ............................................. G06F 13/00
[52] U.S. Cl. ............... 395/830; 395/500; 395/527; 395/681; 395/685; 364/281.7; 364/282.3; 364/978
[58] Field of Search .......................... 395/200, 600, 395/500, 650, 700, 527, 681, 830; 364/300, 281.7, 282, 3, 978

[56] References Cited

U.S. PATENT DOCUMENTS

| | | | |
|---|---|---|---|
| 4,649,479 | 3/1987 | Advani et al. | 395/681 |
| 5,319,751 | 6/1994 | Garney | 395/442 |
| 5,339,432 | 8/1994 | Crick | 395/651 |
| 5,412,798 | 5/1995 | Garney | 395/651 |
| 5,414,848 | 5/1995 | Sandage et al. | 395/677 |
| 5,530,858 | 6/1996 | Stanley et al. | 395/677 |
| 5,548,759 | 8/1996 | Lipe | 395/611 |

*Primary Examiner*—Thomas C. Lee
*Assistant Examiner*—Ki S. Kim
*Attorney, Agent, or Firm*—Richard A. Jordan

[57] ABSTRACT

A virtual device driver registry for use in connection with a computer system for providing virtual device driver call information to a program operating in said computer system in response to a call information request. The virtual device driver registry maintains a registration database including a plurality of entries, each entry including a virtual device driver identifier and virtual device driver call information. The registry establishes the entries in the registration database in response to receipt of virtual device driver registration requests from the virtual device drivers as they are initialized. The registry responds to call information requests from the programs to provide call information for the registered virtual device drivers. Each call request includes a requested virtual device driver identifier, and the registered information supply element retrieves virtual device driver call information associated with the entry whose virtual device driver identifier corresponds to the requested virtual device driver identifier in the request. Accordingly, the virtual device driver registry ensures that the virtual device drivers in the set of virtual device drivers associated with the registry have identifiers that need only be unique for that registry. In addition, the registry provides for greater flexibility in selection of identifiers and enables use of a much larger set of identifiers than would be available using the Microsoft naming scheme, since the identifiers which are registered with the registry are not limited by the Microsoft global identifier scheme using sixteen bit identifiers.

20 Claims, 5 Drawing Sheets

VIRTUAL DEVICE DRIVER REGISTRY HAVING A GLOBALLY UNIQUE IDENTIFIER SUPPLYING VIRTUAL DRIVER CALL INFORMATION TO THE REQUESTING PROGRAM

FIELD OF THE INVENTION

The invention relates generally to the field of digital computer systems, and more specifically to arrangements for facilitating the calling of "driver" programs by, for example, applications programs. The invention provides an arrangement which eliminates the necessity, for virtual device drivers used in connection with the Microsoft Windows™ operating system program, of providing globally-unique identifiers for the virtual device drivers.

BACKGROUND OF THE INVENTION

In performing processing operations, computer systems make use of applications programs to perform such operations as database management, word processing, accounting, process control and numerous other functions in an office or industrial environment. The applications programs generally make use of operating system programs both to provide an environment in which they can be conveniently executed and to provide system services such as low-level control of various hardware elements. One popular operating system program, namely, Microsoft Windows™ operates in conjunction with Microsoft's MS-DOS operating system program to provide an environment in which applications programs written for Windows can be executed. The Windows operating system program provides, among other things, a graphical user interface ("GUI") as well as a multi-tasking operating environment in which a plurality of Windows programs can be executing contemporaneously. In their processing, the applications programs can make use of a variety of device drivers, termed "virtual device drivers," to provide a variety of system-oriented services. For virtual device drivers which provide services to applications programs, or to other virtual device drivers, Windows requires the diverse types of virtual device drivers to have globally-unique identifiers, which are issued by Microsoft Corporation. Since the identifiers are limited to sixteen bits, the number of virtual device driver types is limited to only 64K (K=1024).

SUMMARY OF THE INVENTION

The invention provides an arrangement, comprising a virtual device driver registry that is local to each computer system, which eliminates the necessity of having globally-unique identifiers for the virtual device drivers which may be called by applications programs and other virtual device drivers.

In brief summary, the virtual device driver registry is for use in connection with a computer system for providing virtual device driver call information to a program operating in said computer system in response to a call information request. The virtual device driver registry maintains a registration database including a plurality of entries, each entry including a virtual device driver identifier and virtual device driver call information. A virtual device driver registration element establishes the entries in the registration database in response to receipt of a virtual device driver registration request from a virtual device driver. A registered information supply element responds to call information requests from the application program. Each call request includes a requested virtual device driver identifier, and the registered information supply element retrieves virtual device driver call information associated with the entry whose virtual device driver identifier corresponds to the requested virtual device driver identifier in the request. Accordingly, the virtual device driver registry ensures that the virtual device drivers in the set of virtual device drivers associated with the registry have identifiers that need only be unique for that registry. In addition, the registry provides for greater flexibility in selection of identifiers and enables use of a much larger set of identifiers than would be available using the Microsoft naming scheme, since the identifiers which are registered with the registry are not limited by the Microsoft global identifier scheme using sixteen bit identifiers.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
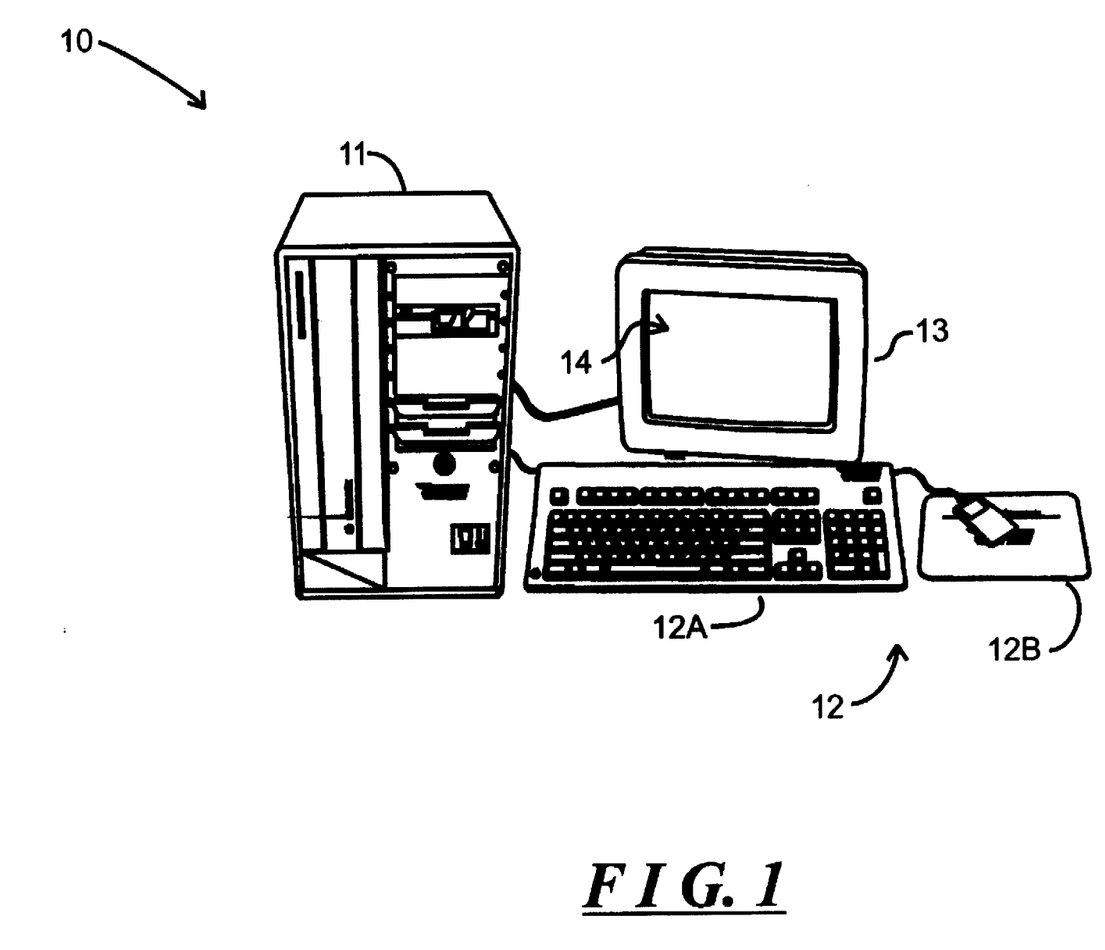
FIG. 1 depicts an illustrative computer system incorporating a virtual device driver registry in accordance with the invention.

FIG. 1 depicts an illustrative computer system 10 constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

The invention is for use in connection with the Microsoft Windows™ operating system program ("Windows"). In Windows, so-called "virtual device drivers" ("Virtual device drivers") provide numerous types of low-level services to applications programs and to other virtual device drivers. A number of virtual device drivers are provided by Microsoft as part of Windows. In addition, other software providers also provide virtual device drivers as part of their software packages. Virtual device drivers may be called by application programs which need their services. Windows requires that each virtual device driver that provides services to an applications program or to another virtual device driver have a globally-unique identifier, which Microsoft assigns, by which an applications program requiring its services will call it. Since only sixteen bits are reserved for the identifier, only 64K (K=1024) virtual device driver identifiers are available.

Figure 2:
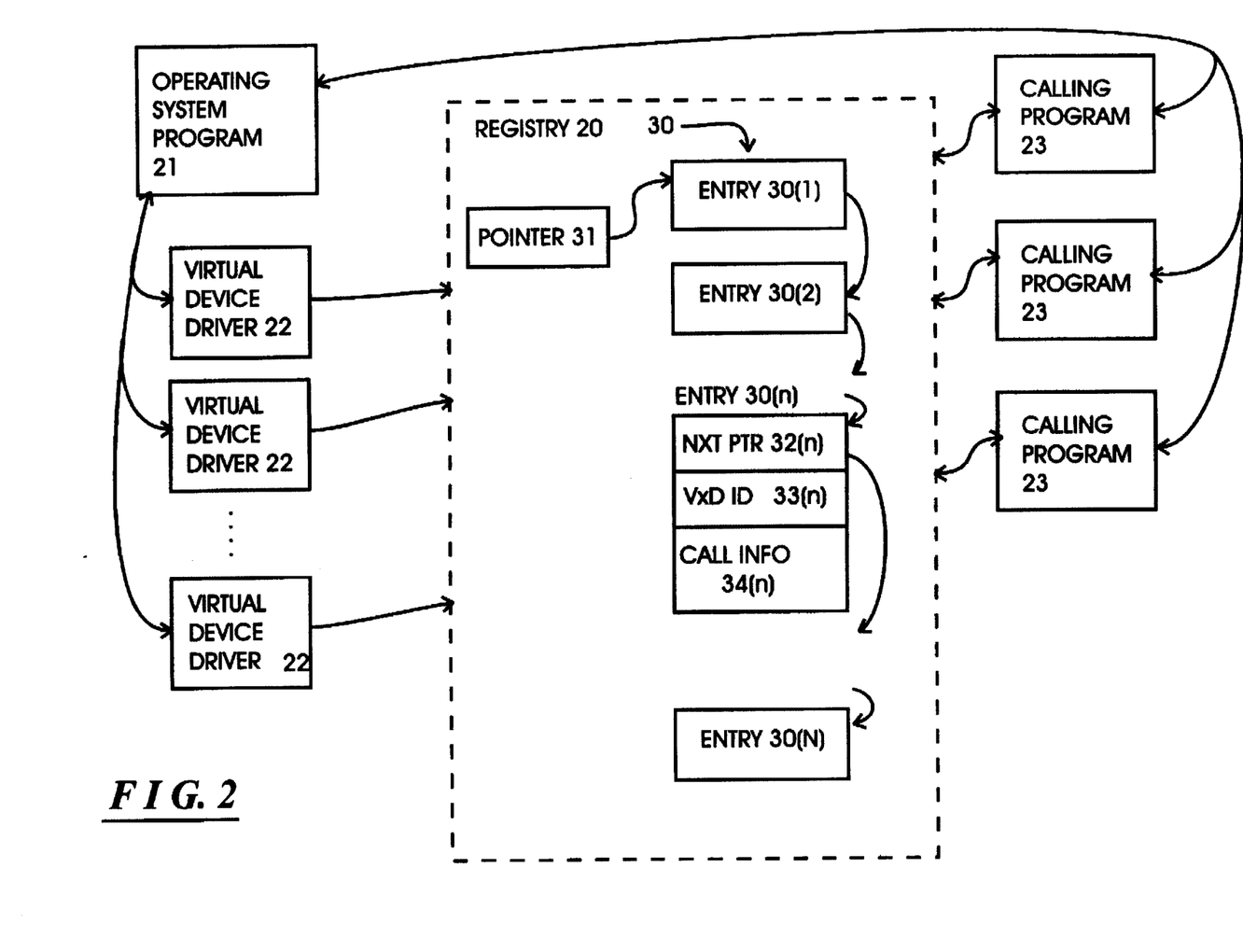
FIG. 2 schematically represents a functional block diagram of various data structures useful in understanding the invention.

With reference to FIG. 2, the invention provides a dynamic virtual device driver registry 20 which relieves the necessity for virtual device drivers to have globally-unique identifiers of any predetermined size. The dynamic virtual device driver registry 20 provides an arrangement by which, when the Windows operating system program 21 loads the virtual device drivers, generally identified by reference numeral 22, at initialization, the virtual device drivers register with the registry 20, using an identifier which only need be unique among users of the registry 20. The registry 20 itself is constructed as a virtual device driver which has a globally-unique identifier as required by Windows. After registering with the registry 20, the virtual device drivers are available for call by calling programs, generally identified by reference numeral 23, such as applications programs and other virtual device drivers, through the registry 20. That is, the applications program or virtual device driver can obtain information from the registry 20 as to how to call the desired virtual device driver, which information typically will be the address of the location in memory used to call the called virtual device driver. After obtaining the call information, the applications program or calling virtual device driver can call the virtual device driver directly.

As shown in FIG. 2, in one embodiment the registry 20 is in the form of a linked list 30 comprising a series of list entries 30(1) through 30(N) (generally identified by reference numeral 30(n) pointed to by a pointer 31. Each entry 30(n) includes several fields, including a next entry pointer field 32(n) for receiving a pointer to the next entry 30(n+1) in the list, a registered virtual device driver name field 33(n) for receiving the registering virtual device driver's identifier, and a calling information field 34(n) for receiving the registering virtual device driver's calling information. When a virtual device driver 21 registers with the registry 20, the registry creates a new entry 30(n), links it to the pointer 31 of the entry is the first entry 30(1) in the list) or to the preceding entry 30(n−1) and inserts the name and calling information in the respective fields 32(n) and 33(n). As is conventional in connection with a linked list, if the entry being created by the registry 20 is the first entry 30(1) in the list, it will link the entry to the list by loading the address of the location of entry 30(1) in the pointer 31. On the other hand, if the entry 30(n) being created is not the first entry, the registry will link the entry to the list by loading the address of entry 30(n) in the next entry pointer field 32(n−1) of entry 30(n−1). The last entry 30(N) in the linked list contains a null value in its pointer field 32(N) which identifies it as the last entry.

Figure 3:
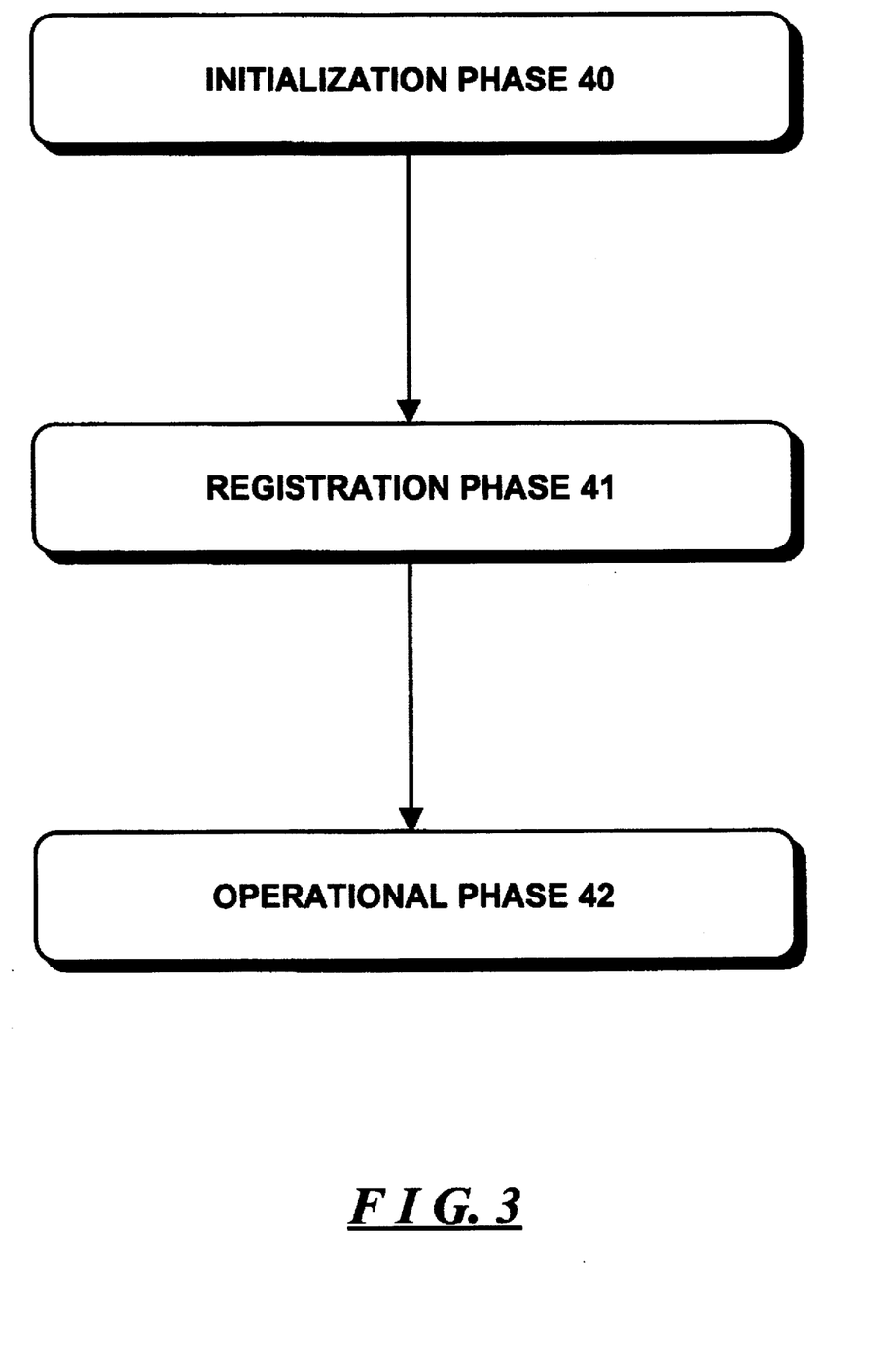
FIGS. 3 through 5 together constitute flow charts depicting the operations performed by the computer system in connection with the invention.

The registry 20 effectively operates in three general phases, as depicted in FIG. 3. In the first "initialization" phase, identified by reference numeral 40, Windows initializes the registry 20 in the same way that it registers any other virtual device driver. In the second "registration" phase 41, as Windows initializes the other virtual device drivers, those virtual device drivers 21 which are to register with the registry 20 call the registry 20 and enable it to create an entry 30(n) including the identifier and calling information for fields 33(n) and 34(n). In the third "operational" phase 42, the registry 20, in response to a request from an applications program or other virtual device driver including a particular identifier, the registry 20 provides the calling information associated with the identifier to the requester. If there is no entry 30(n) associated with the identifier, the registry 20 returns an error code.

As noted above, the operations performed by the registry 20 in connection with the initialization phase 40 are conventional operations performed by a virtual device driver in connection with initialization by Windows, and will not be described further herein. Operations performed in connection with the registration phase 41 and operational phase 42 will be described in connection with the flowchart in FIGS. 4 and 5, respectively.

Figure 4:
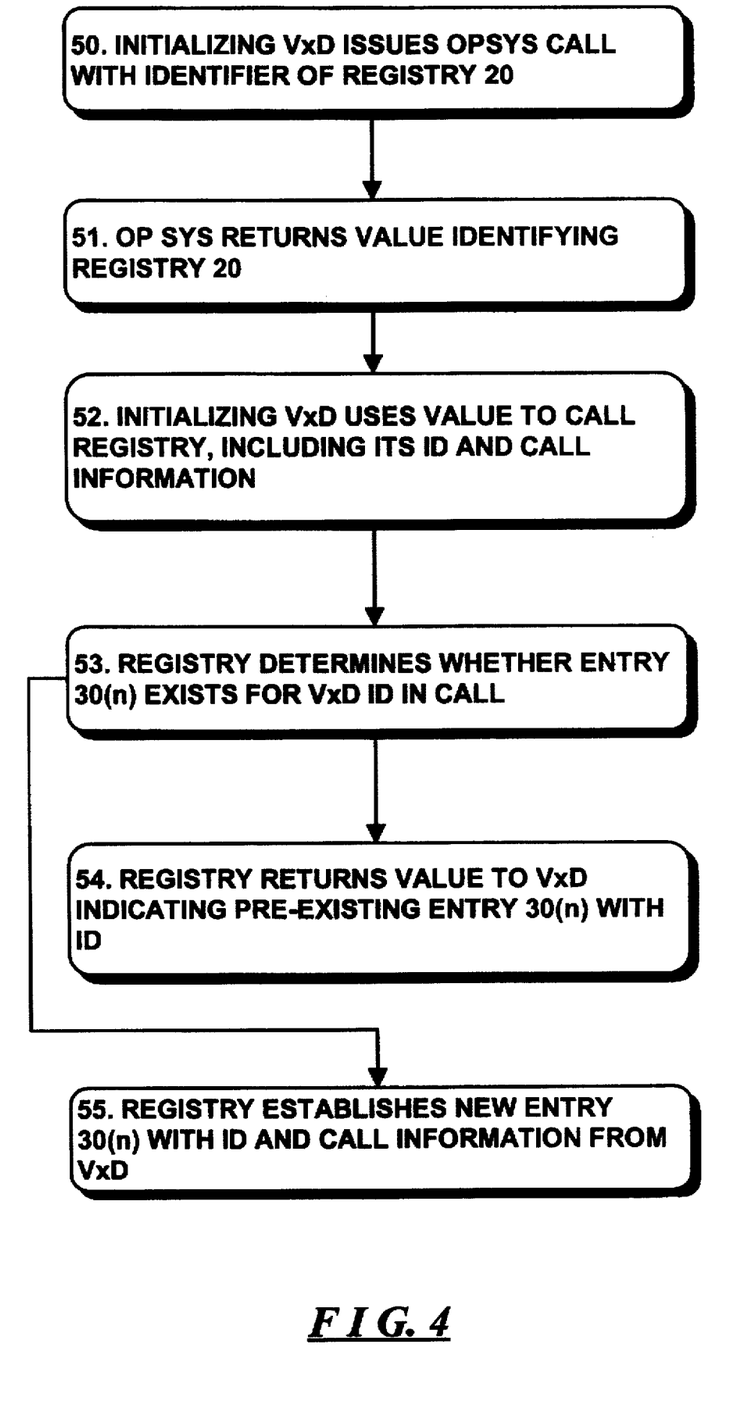

FIG. 4 depicts operations performed in connection with the registration phase 41. With reference to FIG. 4, when a virtual device driver 21 is initialized by Windows, as part of its initialization procedure it issues an operating system call to Windows with the globally-unique identifier of the registry 20 (step 50). Windows returns a value (step 51) which the virtual device driver 21 uses to call the registry 20 (step 52). As part of the call, the virtual device driver 21 includes its identifier and calling information. The registry 20 initially searches through the linked list 30 to determine whether an entry 30(n) already exists for that identifier in identifier field 32(n) (step 53). If the registry determines in step 53 that such an entry 30(n) exists, the registry 20 returns a corresponding value to so notify the virtual device driver 21 (step 54). On the other hand, if the registry 20 determines in step 53 that no such entry 30(n) exists, it creates an entry 30(n) for the information (step 55). In that operation, it will updates the list pointer 31 if the new entry is the first entry 30(1) in the list, or the next-entry pointer 32(n−1) of the preceding entry 30(n−1) if the entry is not the first entry in the list. These operations will be repeated for each virtual device driver 21 which registers with the registry 20.

Figure 5:
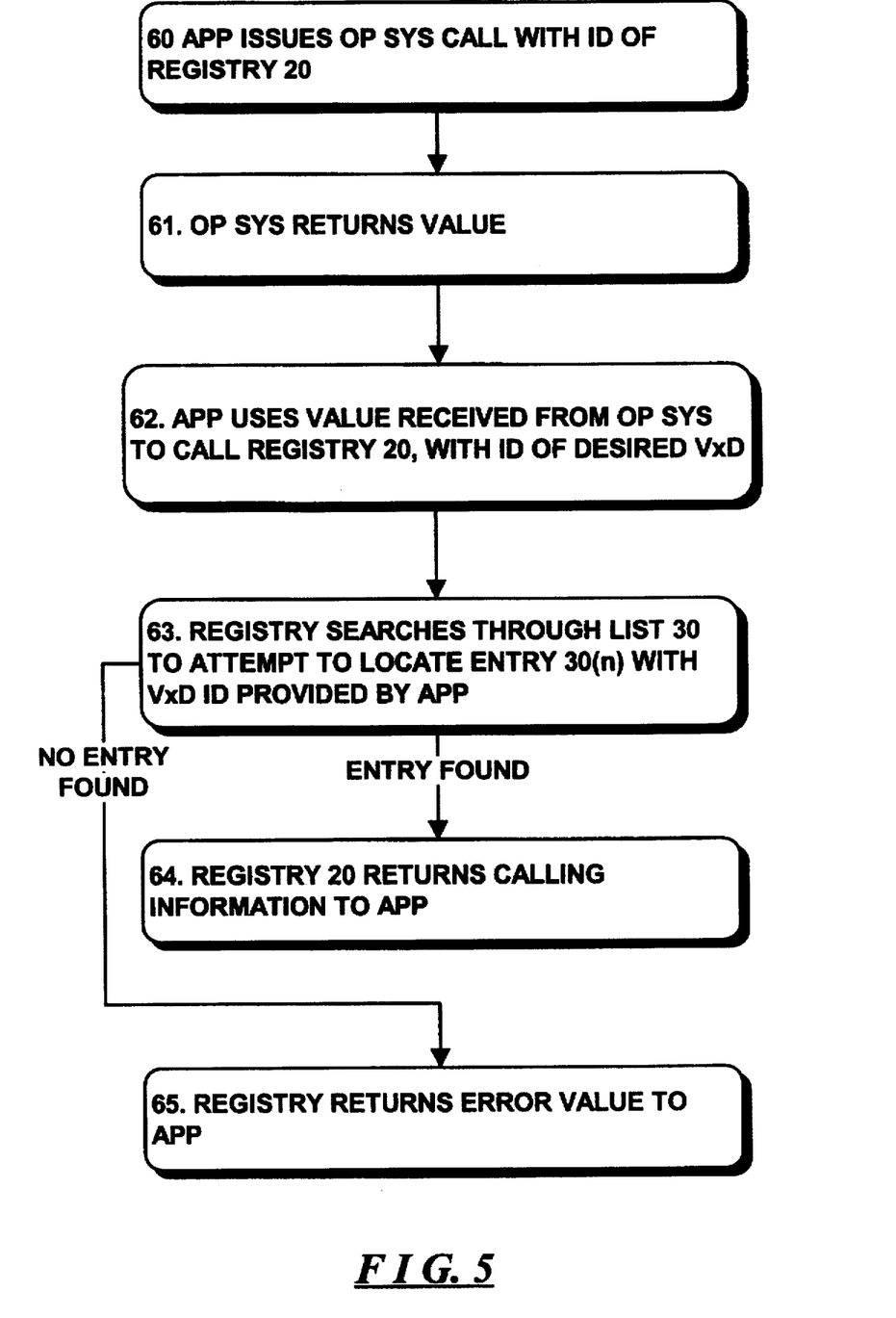

FIG. 5 depicts operations performed in connection with the operational phase 42. With reference to FIG. 5, when an applications program or virtual device driver requires service by a virtual device driver 21 which has registered with the registry, it issues an operating system call to Windows with the globally-unique identifier of the registry 20 (step 60). Windows returns a value (step 61) which the applications program/virtual device driver uses to call the registry 20 (step 62), the call constituting the request as described above. As part of the call the applications program/virtual device driver includes the identifier of the virtual device driver 21 whose service is required. Upon receiving the call, the registry 20 steps through the sequential entries 30(n) of the linked list in a conventional manner using the list pointer 31 and the pointers in the successive next entry fields 32(n), to locate an entry 30(n) whose identifier field 33(n) contains a value corresponding to the identifier provided by the applications program/virtual device driver (step 63). If the registry 20 finds such an entry, it returns the calling information in the entry to the requesting applications program/virtual device driver (step 64). On the other hand, if the registry 20 in step 63 does not find an entry 30(n) whose identifier field 33(n) contains a value corresponding to the identifier provided by the applications program/virtual device driver, it returns an error value (step 65). If the registry 20 returns virtual device driver call information in step 64, the calling applications program/virtual device driver can use the call information to call the desired virtual device driver 21. On the other hand, if the registry 20 returns an error value in step 65, the calling applications program/ virtual device driver can perform predetermined error recovery operations.

While the registry 20 has been depicted as being constructed as a linked list, it will be appreciated that it may be constructed in a number of other forms, including, for example, as a table or database or similar structure.

The registry 20 provides a number of advantages. It effectively eliminates the necessity of using globally-unique virtual device driver identifiers for all of the possible virtual device drivers which may be used in a set of virtual device drivers. Instead, it requires only that virtual device drivers in the set of virtual device drivers associated with the registry have identifiers that need only be unique for that registry. In addition, the registry 20 provides for greater flexibility in identifier selection, enabling use of a much larger set of identifiers than would be available using the Microsoft naming scheme, since the identifiers which are registered with the registry are not limited by the Microsoft global identifier scheme using sixteen bit identifiers.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A virtual device driver registry for use in connection with a computer system for providing virtual device driver call information to a program operating in said computer system in response to a call information request, the virtual device driver registry having a globally-unique identifier, the virtual device driver registry comprising:

A. a registration database including a plurality of entries, each entry including a virtual device driver identifier and virtual device driver call information;
   B. a virtual device driver registration element responsive to receipt of a virtual device driver registration request including virtual device driver identifier information and virtual device driver device driver call information for establishing an entry in the registration data base including the virtual device driver identifier information and virtual device driver device driver call information in the request; and
   C. a registered information supply element responsive to a call information request from the program, the call information request including
      (i) the globally-unique identifier of the virtual device driver registry thereby to enable the virtual device driver registry to respond to the call information request, and
      (ii) the call information request further including a requested virtual device driver identifier,
      the registered information supply element in response to the call information request making available to the program virtual device driver call information associated with the entry whose virtual device driver identifier corresponds to the requested virtual device driver identifier in the request.

2. A registry as defined in claim 1 in which the registration database is in the form of a linked list.

3. A registry as defined in claim 2 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the virtual device driver registration element, in response to receipt of a virtual device driver registration request from a virtual device driver, establishing an entry in the linked list and loading the virtual device driver's virtual device driver identifier information and virtual device driver calling information in the established entry.

4. A registry as defined in claim 2 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the registered information supply element, in response to a call information request from the program, stepping through successive entries in the linked list to identify an entry whose registered virtual device driver name field contains virtual device driver identifier information corresponding to the requested virtual device driver and providing virtual device driver calling information from the calling information field of the identified entry to the requesting program.

5. A virtual device driver registry for providing virtual device driver call information to a program in response to a call information request, the virtual device driver registry having a globally-unique identifier, the virtual device driver registry comprising:

A. a computer system; and
   B. a control subsystem including:
      i. a virtual device driver registration element for enabling the computer system, responsive to receipt of a virtual device driver registration request including a globally-unique identifier of a virtual device driver registry and virtual device driver identifier information and virtual device driver device driver call information, to establish an entry in a registration data base including the virtual device driver identifier information and virtual device driver device driver call information in the request; and
      ii. a registered information supply element for enabling the computer system, responsive to a call information request from the program, the call information request including
         (a) the globally-unique identifier of the virtual device driver registry thereby to enable the registered information supply element to enable the computer system to respond to the call information request, and
         (b) a requested virtual device driver identifier,
         to make available to the program virtual device driver call information associated with the entry whose virtual device driver identifier corresponds to the requested virtual device driver identifier in the request.

6. A registry as defined in claim 5 in which virtual device driver registration element enables the computer system to establish the registration database in the form of a linked list.

7. A registry as defined in claim 6 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the virtual device driver registration element enabling the computer system, in response to receipt of a virtual device driver registration request from a virtual device driver, to establish an entry in the linked list and loading the virtual device driver's virtual device driver identifier information and virtual device driver calling information in the established entry.

8. A registry as defined in claim 6 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the registered information supply element enabling the computer system, in response to a call information request from the program, to step through successive entries in the linked list to identify an entry whose registered virtual device driver name field contains virtual device driver identifier information corresponding to the requested virtual device driver and provide virtual device driver calling information from the calling information field of the identified entry to the requesting program.

9. A control subsystem for use in connection with a computer system to establish a virtual device driver registry for providing virtual device driver call information to a program in response to a call information request, the virtual device driver registry having a globally-unique identifier, the control subsystem comprising:

A. a virtual device driver registration element for enabling the computer system, responsive to receipt of a virtual device driver registration request including virtual device driver identifier information and virtual device driver device driver call information, to establish an entry in a registration data base including the virtual device driver identifier information and virtual device driver device driver call information in the request; and B. a registered information supply element for enabling the computer system, responsive to a call information request from the program, the call information request including
(a) the globally-unique identifier of the virtual device driver registry thereby to enable the registered information supply element to enable the computer system to respond to the call information request, and
(b) requested virtual device driver identifier,
to make available to the program virtual device driver call information associated with the entry whose virtual device driver identifier corresponds to the requested virtual device driver identifier in the request.

10. A control subsystem as defined in claim 9 in which virtual device driver registration element enables the computer system to establish the registration database in the form of a linked list.

11. A control subsystem as defined in claim 10 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the virtual device driver registration element enabling the computer system, in response to receipt of a virtual device driver registration request from a virtual device driver, to establish an entry in the linked list and loading the virtual device driver's virtual device driver identifier information and virtual device driver calling information in the established entry.

12. A control subsystem as defined in claim 10 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the registered information supply element enabling the computer system, in response to a call information request from the program, to step through successive entries in the linked list to identify an entry whose registered virtual device driver name field contains virtual device driver identifier information corresponding to the requested virtual device driver and provide virtual device driver calling information from the calling information field of the identified entry to the requesting program.

13. A computer program product for use in connection with a computer system to establish a virtual device driver registry for providing virtual device driver call information to a program in response to a call information request, the virtual device driver registry having a globally-unique identifier, the computer program product comprising a computer readable medium including:

A. virtual device driver registration code devices for enabling the computer system, responsive to receipt of a virtual device driver registration request including virtual device driver identifier information and virtual device driver device driver call information, to establish an entry in a registration data base including the virtual device driver identifier information and virtual device driver device driver call information in the request; and B. registered information supply code devices for enabling the computer system, responsive to a call information request from the program, the call information request including
(a) the globally-unique identifier of the virtual device driver registry thereby to enable the registered information supply element to enable the computer system to respond to the call information request, and
(b) a requested virtual device driver identifier,
to make available to the program virtual device driver call information associated with the entry whose virtual device driver identifier corresponds to the requested virtual device driver identifier in the request.

14. A computer program product as defined in claim 13 in which virtual device driver registration code devices enable the computer system to establish the registration database in the form of a linked list.

15. A computer program product as defined in claim 14 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the virtual device driver registration code devices enabling the computer system, in response to receipt of a virtual device driver registration request from a virtual device driver, to establish an entry in the linked list and loading the virtual device driver's virtual device driver identifier information and virtual device driver calling information in the established entry.

16. A computer program product as claimed in claim 14 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the registered information supply code devices enabling the computer system, in response to a call information request from the program, to step through successive entries in the linked list to identify an entry whose registered virtual device driver name field contains virtual device driver identifier information corresponding to the requested virtual device driver and provide virtual device driver calling information from the calling information field of the identified entry to the requesting program.

17. A method of operating a computer system to establish a virtual device driver registry for providing virtual device driver call information to a program in response to a call information request, the virtual device driver registry having a globally-unique identifier, the method comprising the steps of:

A. enabling the computer system, responsive to receipt of a virtual device driver registration request including virtual device driver identifier information and virtual device driver device driver call information, to establish an entry in a registration data base including the virtual device driver identifier information and virtual device driver device driver call information in the request; and B. enabling the computer system, responsive to a call information request from the program, the call information request including
   (a) the globally-unique identifier of the virtual device driver registry thereby to enable the registered information supply element to enable the computer system to respond to the call information request, and
   (b) a requested virtual device driver identifier,
   to make available to the program virtual device driver call information associated with the entry whose virtual device driver identifier corresponds to the requested virtual device driver identifier in the request.

18. A method as defined in claim 17 in which the computer system establishes the registration database in the form of a linked list.

19. A method as defined in claim 18 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, the computer system in the virtual device driver registration step, in response to receipt of a virtual device driver registration request from a virtual device driver, establishing an entry in the linked list and loading the virtual device driver's virtual device driver identifier information and virtual device driver calling information in the established entry.

20. A method as defined in claim 18 in which the linked list comprises a series of entries, each entry including a plurality of fields including a next entry pointer field for receiving a pointer to the next entry in the linked list, a registered virtual device driver name field for receiving virtual device driver identifier information for a virtual device driver, and a calling information field for receiving virtual device driver calling information for a virtual device driver, computer system in the registered information supply code step, in response to a call information request from the program, stepping through successive entries in the linked list to identify an entry whose registered virtual device driver name field contains virtual device driver identifier information corresponding to the requested virtual device driver and provide virtual device driver calling information from the calling information field of the identified entry to the requesting program.

* * * * *